US008630290B1

(12) United States Patent
Frieh et al.

(10) Patent No.: US 8,630,290 B1
(45) Date of Patent: Jan. 14, 2014

(54) USING A DFA UNIT FOR CLASSIFICATION LIST PROCESSING

(75) Inventors: Dwain Edward Frieh, Oswego, IL (US); Erich C. Arnold, Naperville, IL (US); Ayham Al-Banna, Orland Park, IL (US)

(73) Assignee: ARRIS Enterprise, Inc., Suwanee, GA (US)

( * ) Notice: Subject to any disclaimer, the term of this patent is extended or adjusted under 35 U.S.C. 154(b) by 209 days.

(21) Appl. No.: 13/087,430

(22) Filed: Apr. 15, 2011

Related U.S. Application Data (60) Provisional application No. 61/324,334, filed on Apr. 15, 2010.

(51) Int. Cl.
*H04L 12/28* (2006.01)
*H04L 12/56* (2011.01)
*G06F 15/173* (2006.01)

(52) U.S. Cl.
USPC ............ 370/389; 370/392; 709/224; 713/160

(58) Field of Classification Search
USPC .......... 370/230–242, 389–392; 709/224–227, 709/231–240; 713/166–168
See application file for complete search history.

(56) References Cited

U.S. PATENT DOCUMENTS

| 7,185,081 | B1* | 2/2007 | Liao ............................. 709/224 |
| 7,188,168 | B1* | 3/2007 | Liao ............................. 709/224 |
| 7,240,040 | B2* | 7/2007 | Wyschogrod et al. .......... 706/48 |
| 7,260,558 | B1* | 8/2007 | Cheng et al. .................... 706/12 |
| 7,802,094 | B2* | 9/2010 | Furlong et al. ................ 713/160 |
| 8,156,247 | B2* | 4/2012 | McMillen ..................... 709/240 |
| 8,176,300 | B2* | 5/2012 | Goyal et al. .................. 712/220 |
| 2006/0059196 | A1* | 3/2006 | Sato et al. .................. 707/104.1 |
| 2006/0069872 | A1* | 3/2006 | Bouchard et al. ............ 711/121 |
| 2008/0101371 | A1* | 5/2008 | Law et al. ..................... 370/392 |
| 2010/0192225 | A1* | 7/2010 | Ma et al. ........................ 726/23 |
| 2012/0084245 | A1* | 4/2012 | Law et al. ...................... 706/47 |

* cited by examiner

*Primary Examiner* — Man Phan
(74) *Attorney, Agent, or Firm* — Troy A. Van Aacken (57) ABSTRACT

Systems and methods can operate to use a deterministic finite automata module to classify data. In various implementations, a converter can be used to convert a classification list to a state machine operable to be executed by the deterministic finite automata module. In some implementations, the converter can be used to produce a state machine from template data, the state machine being operable to be executed by the deterministic finite automata module.

13 Claims, 7 Drawing Sheets

USING A DFA UNIT FOR CLASSIFICATION LIST PROCESSING

RELATED APPLICATIONS

This application is a non-provisional application claiming the benefit of U.S. Provisional Application Ser. No. 61/324,334, entitled "Using a DFA Unit for Classification List Processing," filed Apr. 15, 2010, which is hereby incorporated by reference in its entirety.

TECHNICAL FIELD

This disclosure relates to processing a classification list.

BACKGROUND

A deterministic finite state machine, also known as deterministic finite automata (DFA), may be generally described as a finite state machine that accepts a string of input symbols, and will either accept the string or reject the string, depending on whether the DFA is in an accepting state or a non-accepting state after the last symbol is processed.

Figure 1:
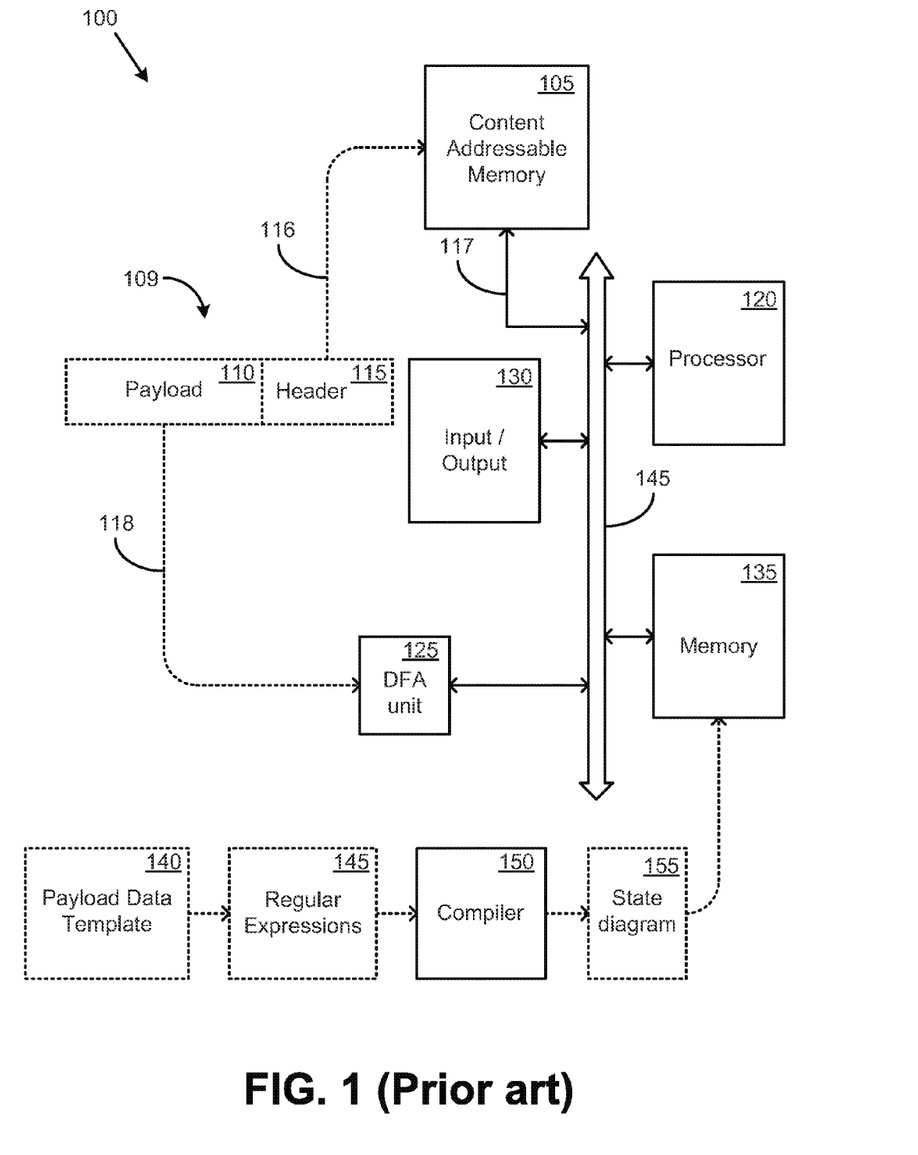
FIG. 1 is a block diagram illustrating a prior art communication system incorporating a content addressable memory for header processing and a DFA unit for payload processing of an input data stream.

FIG. 1 shows a prior art communication system 100 incorporating a DFA unit 125 for processing an input data packet 109 that is fed into system 100 via input/output 130. Input data packet 109, which is a component of a data stream containing many such data packets, contains two portions—a header 115 and a payload 110. The header 115 is used for control, routing and messaging functions, while the payload 110 carries information in the form of digital data. A string of data symbols (bytes) contained in header 115 can be processed first to determine what actions can be carried out upon payload 110 by one or more applications executed on system 100. The processing of header 115 can be carried out by sequentially presenting each byte contained in the string of data symbols of header 115 as address bytes for addressing content addressable memory (CAM) 105. This addressing process flow is indicated in FIG. 1 by dotted link 116, which is a symbolic representation of the actual process wherein addresses are transmitted from input/output 130 to CAM 105 via system bus 145.

CAM 105 can be configured to contain a classification list, such as an Access Control List (ACL), wherein each entry of the classification list can be stored in different address locations, and further wherein the entries conform to a row-format having two distinct fields. The first of the two fields is used for identifying a match against a set of header bytes presented to CAM 105, while the second field provides results data, in the form of various deny/permit flags for example.

In operation, when a set of bytes of header 115 is presented to CAM 105, a search is carried out to determine if any of the contents of CAM 105 match these header bytes. The set of header bytes which are presented for comparison with the ACL entry form a "key." The key should match an ACL entry of CAM 105. Note that based on the setting of the associated wildcard mask with each CAM entry, some of the bits compared may be "don't$_{13}$ care." If a match is found in a particular row, the contents of the second field of that particular row is output as a first match result from CAM 105. The first match result is transported via link 117 and system bus 145, to processor 120, which is also communicatively coupled to system bus 145.

The match results can be processed using a software program stored in a suitable memory device, such as memory 135, and executed by processor 120. If the results derived from execution of the software program indicate that payload 110 can be accessed, digital data in the form of character strings carried in payload 110 can then be coupled into DFA unit 125 for what is known as Deep Packet Inspection (DPI). This DPI process flow is indicated in FIG. 1 by dotted link 118, which is a symbolic representation of data transmitted from input/output 130 to DFA unit 125 via system bus 145.

As can be appreciated, the use of DFA unit 125 incorporates execution of a state machine. The state machine is executed by using a state diagram that is stored in a suitable memory of system 100. For example in FIG. 1, the state diagram 155 is stored in memory 135 and provided to DFA unit 125 for execution of the state machine.

The generation of the state diagram 155 is typically carried out using a compiler 150. Compiler 150 may be implemented as a software program that is resident in a personal computer (not shown) for example. In operation, a payload data template 140 can be created for incorporation into state diagram 155 one or more decision nodes for identifying various bytes of data being carried in payload 110. Payload data template 140 is first translated into regular expressions 145 using a suitable regular language. Regular expressions 150 can then be fed into compiler 150 for generating state diagram 155, which can be stored in memory 135 to enable DFA unit 125 to execute Deep Packet Inspection of payload 110.

In summary, prior art communication system 100 incorporates two distinct procedures for processing the two portions of an input data packet 109. Header data 115 is processed via a first process using a CAM 105 in conjunction with a processor 120 that executes a software program designed for header processing; while payload data 110 is processed by DFA unit 125 using state diagram 155 that is generated from a payload data template 140. The generation of state diagram 155 involves converting payload data template 140 into regular expressions 145, which is then provided to compiler 150 in order to compile state diagram 155.

BRIEF DESCRIPTION OF THE DRAWINGS

Many features of the disclosure can be better understood with reference to the following drawings. The components in the drawings are not necessarily to scale. Instead, emphasis is placed upon clearly illustrating the principles of various implementations described herein. Moreover, in the drawings, like reference numerals designate corresponding parts throughout the several views.

DETAILED DESCRIPTION

The various implementations disclosed herein generally describe systems and methods related to using a deterministic finite automata (DFA) unit for processing a classification list. Use of the DFA for processing a classification list can be done, for example, by converting the classification list into a state diagram and using the state diagram to process incoming data packet header information.

Figure 2:
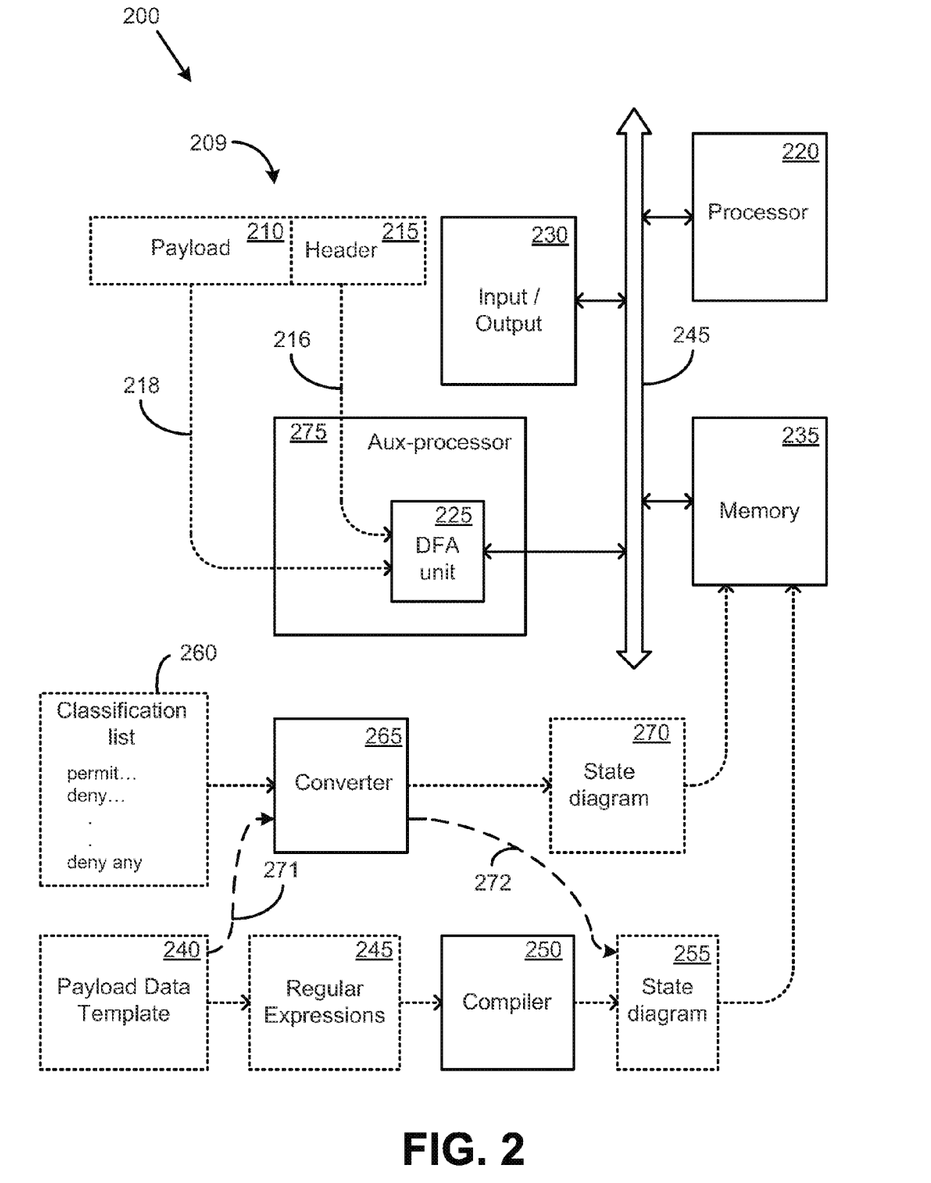
FIG. 2 is a block diagram illustrating an example implementation of a communication system incorporating a DFA unit for processing both the header and the payload portion of an input data stream.

FIG. 2 shows a communication system 200 incorporating a DFA unit 225 that can be used to process the header 215 and the payload 210 portions of an input data packet 209. It should be understood that input data packet 209 is one representative packet amongst many such data packets carried in a data stream. Depending upon the application, the data stream can be formatted in many different ways, such as for example, an ethernet format, a transmission control protocol/internet protocol (TCP/IP) format, or a user datagram protocol (UDP) packet. Based upon the selected format and the specific application, header 215 can include for example, a media access control (MAC) address when used for ethernet applications, or TCP/IP routing information when used for Internet applications. Based upon the header 215, payload 210 can contain ethernet data or TCP/IP data.

The information carried in header 215 is typically provided by setting the state of each of one or more bits to indicate control actions that can be carried out upon payload 210. The information carried in header 215 can also be used to provide an indication of the nature of payload 210. When used for purposes of control, for example, a first bit of header 215 can be set to a 'zero' state to provide an indication that payload 210 should be allowed to propagate through a communications device, a router for example, without the router accessing the bits contained therein. On the other hand, this first bit can be set to a 'one' state to provide an indication that payload 210 should be processed in the router so as to route payload 210 to a specific destination address.

More generally, header 215 can be configured as a string of bytes, and this string of bytes has to be processed in order to determine what action needs to be carried out upon payload 210. Header processing will be explained below in further detail in an example cable modem termination system that includes a communications system 200. It should be understood that CMTS is shown solely for purposes of explanation and should not be construed as a limitation, because communication system 200 shown in FIG. 2 can represent a variety of communication systems in different implementations. Additional details of the CMTS are provided below, using FIG. 8 for purposes of illustration.

In the CMTS example, a header 215 can carry information conforming to various types of classification lists. One example of a classification list is an access control list (ACL). An ACL entry can includes a flag that is set to different states to provide a 'permit' or a 'deny' status to an entity, such as a router, for example, attempting to access payload 210.

Communication system 200 can further incorporate a processor 220, a memory 235, and an auxiliary processor 275 containing DFA unit 225. Additional elements such as data buffers, signal drivers, signal receivers, power supplies etc. have been omitted from the drawing in favor of clarity, though it should be understood that they can be present in various actual implementations. Persons of ordinary skill in the art can recognize the nature of several of these additional elements. Persons of ordinary skill in the art will also recognize that system bus 245 is indicative of a variety of buses such as an address bus, a data bus, and a control bus. It may be also pertinent to point out that DFA unit 225 is shown in FIG. 2 as contained inside an auxiliary processor 275. However, it should be understood that this is merely one implementation shown for purposes of explanation. In other implementations, the DFA unit 225 can be a stand-alone unit, communicatively coupled to system bus 235, and processing functions carried out by auxiliary processor 275 can be incorporated into processor 220. Similarly, memory 235 shown in FIG. 2 can be implemented in a variety of ways, some of which are described below using FIG. 7 for illustration purposes.

The operation of communication system 200 will now be explained in more detail. Input data packet 209, which includes the header 215 and the payload 210, can be fed into system bus 245 via input/output (I/O) 230. DFA unit 225, which is communicatively coupled to system bus 245, accesses header 215 for processing the information contained therein. This access process is indicated in FIG. 2 by dotted link 216, which can be a symbolic representation of header 215 transported from input/output 230 to DFA unit 225 via system bus 245.

DFA unit 225 further accesses payload 110 via system bus 210 and processes payload 210 based upon the control information obtained by processing header 215. This second access process is indicated in FIG. 2 by dotted link 218, which is a symbolic representation of payload 210 transported from input/output 230 to DFA unit 225 via system bus 245.

It should be noted that in contrast to prior art FIG. 1, wherein header 115 is operated upon by CAM 105 and wherein payload 110 is operated upon separately by DFA unit 125, in FIG. 2, both header 215 as well as payload 210 are operated upon by DFA unit 225. It should be noted that a system can also use the DFA to operate on only the header. Consequently, the prior art use of a CAM (and associated issues) have been eliminated in the embodiment shown in FIG. 2. This elimination provides various benefits such as for example, reduction in hardware elements, reduction in complexity, savings in real estate on a printed circuit board (PCB), and preferably, a savings in cost.

In a further contrast to prior art FIG. 1, wherein a state diagram 155 is generated for purposes of processing payload 110, in the implementation of FIG. 2 two state diagrams are generated. A first state diagram can be generated for purposes of processing payload 210 and a second state diagram can be generated to process header 215. The generation of these two state diagrams will now be described in further detail.

The first of the two state diagrams, used for processing header 215, is generated by using a converter 265, and then stored in memory 235. The input provided to converter 265 is a classification list 260. A few non-exhaustive examples of classification list 260 include: an access control list (ACL), a data-over-cable service interface specification (DOCSIS) classification list, and a DOCSIS subscriber management filter list. As explained above, a classification list includes various flags that are set to different states in order to provide a 'permit' or a 'deny' status to an entity, such as a router for example, attempting to access payload 210 of input data packet 209.

Unlike in prior art FIG. 1, wherein a compiler 150 is used together with regular expressions 145, in the embodiment shown in FIG. 2, classification list 260 can be provided directly to the converter 265 for generation of the state diagram 270. As can be appreciated, the elimination of prior art compiler 150 and associated regular expressions 145, provides various benefits such as elimination of dependency upon a proprietary compiler 150, and a reduction in complexity as a result of not using a regular language to create regular expressions 245.

Converter 265 can be implemented in a variety of ways using hardware, firmware, software and/or a combination of hardware, firmware, and software. Some examples of hardware include a personal computer (PC) or logic circuitry such as a processor or a programmable logic device. One amongst several examples of software includes a converter software application executed on a PC.

The second of the two state diagrams, state diagram 255, can be generated in two ways. In a first embodiment, state diagram 255 is generated using a compiler 250. Compiler 250 can be implemented as a software program that can be resident in a PC. In operation, a payload data template 240 can be created to incorporate into state diagram 255 one or more decision nodes for identifying various bytes of data being carried in payload 210. Payload data template 240 can then be translated into regular expressions 245 using a suitable regular language. Regular expressions 250 can be fed into compiler 250 for generating state diagram 255. The state diagram can then be stored in memory 235 so as to enable DFA unit 225 to execute deep packet inspection of payload 210.

In a second embodiment, the state diagram 255 can be generated using a converter, such as converter 265. This generation process is indicated in FIG. 2 by dotted lines 271 and 272. It should be understood that converter 265 can be a single converter that is used to generate both state diagrams or can be two different converters each of which is tailored for generating state diagram 270 and state diagram 255 respectively.

Figures 3A, 3B:
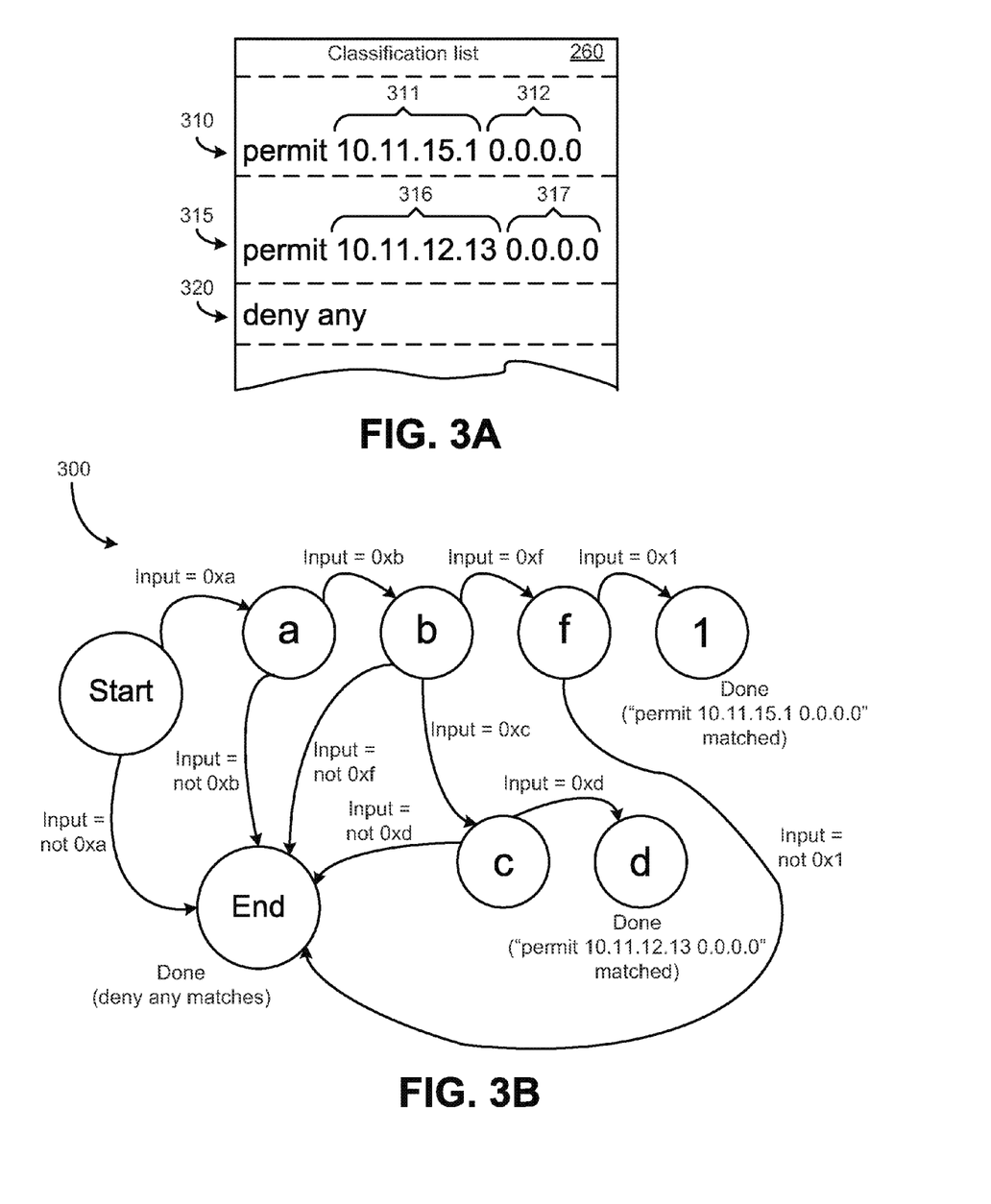
FIGS. 3A-B is a diagram illustrating one simplified example of a state diagram that can be used by the DFA unit of FIG. 2 for processing the header portion.

Attention is now drawn to FIGS. 3A-B for explaining the operation of a state diagram for implementing a classification list processing. FIG. 3A shows classification list 260 with some example entries, while FIG. 3B shows a state diagram 300 that is executed by the DFA unit 225 for processing the header 215 of input data packet 209. As described above, payload 210 of input data packet 209 is also processed using a second state diagram (not shown). The operation and functionality of this second state diagram can be understood from the description provided below for the first state diagram 300.

The operation of DFA unit 225 in terms of executing a state diagram in conjunction with auxiliary processor 275 (or processor 220) will be omitted herein, since this process is known in general form to persons of ordinary skill in the art.

The classification list 260 of FIG. 3A is shown to contain three entries: a first entry 310, a second entry 315, and a third entry 320. It should be understood that these entries are example entries that are being used solely for purposes of explanation. In various implementations, classification list 260 can include several more entries or may contain just one entry.

A first entry 310 and second entry 315 can include two parts, shown in byte format using decimal numbers. With reference to first entry 310, the first part is an IP address 311, while the second part is a mask 312. Similarly, second entry 315 includes an IP address 316 and a mask 317. Each of the IP addresses can be a source IP address or a destination IP address that can be interpreted to route payload 210 of input data packet 209. Each of the masks 312 and 317 contains 4 bytes thereby providing 32 bits that can be used as mask bits against the 32 bits contained in the corresponding IP address.

To elaborate, mask 312 shows all bits to be zero, thereby signifying that each of the 32 bits contained in IP address 311 has to be considered for purposes of interpreting header 215 when an IP address 10.11.15.1 is present in header 215. Similarly, mask 317 shows all bits to be zero, thereby signifying that each of the 32 bits contained in address 316 has to be considered for purposes of interpreting header 215 when an IP address 10.11.12.13 is present in header 215.

On the other hand, for example, if mask 312 were set to 0.0.0.1, the corresponding bit contained in IP address 311 will be masked out and therefore ignored by DFA 225.

It can be appreciated that header 215 can carry many IP addresses. Consequently, in various implementations, classification list 260 is suitably populated with several desired address-mask combinations.

Turning now to FIG. 3B, state diagram 300 shows various nodes where decisions are made for transitioning through the various states, depending on the status of the various bits in the input IP address. It should be noted that the addresses indicated in state diagram 300 are shown in hexadecimal format. Consequently, it should be understood that decimal "10" of IP address 311 in classification list 260 of FIG. 3A corresponds to "0xa" in hexadecimal format as shown in state diagram 300 of FIG. 3B.

To illustrate the operation of state diagram 300, when data contained in header 215 is presented to state diagram 300 as a sequence of bytes that are propagated through state diagram 300, a first determination can be made to check if the first byte corresponds to decimal 10 (0xa in Hex) to determine if the presented byte corresponds to either the first IP address 311 or the second IP address 316 (both of which have decimal 10 representing the first byte of the address portion).

If the first byte is 0xa, a transition is made from the Start node to node a. On the other hand, if the first byte is not 0xa (thereby indicating that the input address is neither IP address 311 nor IP address 316), a transition is made to the End node, thereby terminating further processing of the input address. Such a situation may arise when header 115 is carrying an address that is not applicable to communication system 200.

If a transition is made from the Start node to node a, a determination is made at node a to check if the second byte corresponds to 0xb (11 decimal). Here again, it should be noted that the second byte in both IP address 311 and IP address 316 is 0xb. If the second byte is 0xb, a transition can be made from node a to node b. On the other hand, if the second byte is not 0xb, a transition can be made from node a to the End node.

At node b, a further determination is made to check if the third byte corresponds to either 0xf ("15" of IP address 315) or 0xc ("12" of IP address 316). If the third byte is 0xc, a transition can be made from node b to node c. On the other hand, if the third byte is 0xf, a transition can be made from node b to node f. Furthermore, if the third byte is neither 0xf nor 0xc, a transition can be made from node b to the End node.

At node f, a determination is made to check if the fourth byte corresponds to 0x1. If the fourth byte is 0x1, a transition can be made from node f to node 1, which provides an indication that the detected address in header 215 is the first IP address 311 (10.11.15.1). If the fourth byte is not 0x1, a transition can be made from node f to End node thereby indicating that the match was unsuccessful and that the detected address in header 215 is not the first IP address 311.

Similarly, at node c, a determination is made to check if the fourth byte corresponds to 0xd. If the fourth byte is 0xd, a transition can be made from node f to node d, which provides an indication that the detected address in header 215 is the second IP address 316 (10.11.12.13). If the fourth byte is not 0xd, a transition can be made from node c to End node thereby indicating that the match was unsuccessful and that the detected address in header 215 is not the second IP address 316.

Referring back to FIG. 3A, the third entry 320 is a "deny all" entry which indicates that all the addresses carried in header 215 are to be denied because none of the addresses match either first address 311 or second address 316. This indication corresponds to the End node in state diagram 300.

Figure 4:
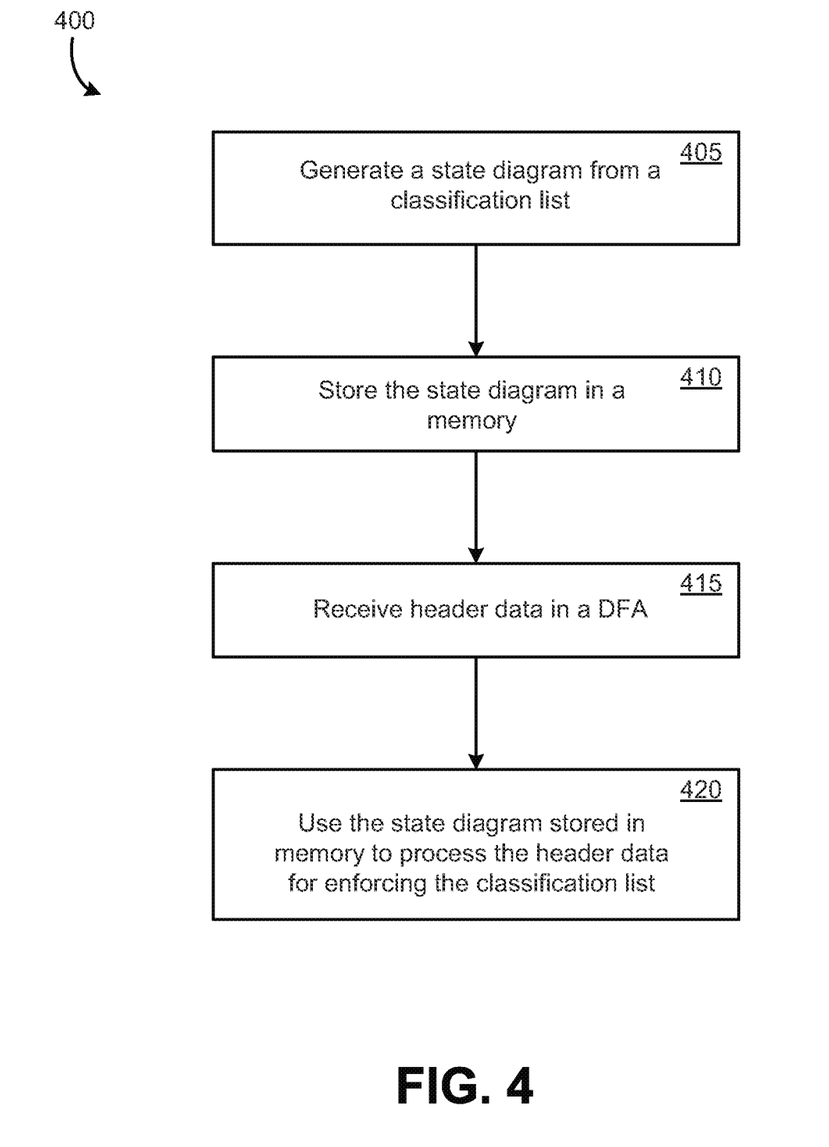
FIG. 4 is a flowchart illustrating an example process of analyzing the header portion of an input data packet.

FIG. 4 shows a flow chart 400 that describes a method for processing the header portion of an input data packet. In block 405, a state diagram is generated using a classification list. One such example process has been described above using FIG. 2, which shows a classification list 260 and a converter 265 that are used to generate state diagram 270.

In block 410, the generated state diagram is stored in a memory. FIG. 2 shows state diagram 255 stored in memory 235. In block 415, header data is received in a DFA unit. FIG. 2 shows an example scenario wherein header 215 is received in DFA unit 225.

In block 420, the state diagram is used to process header data for enforcing the classification list. An example process has been described above using FIGS. 3A and 3B.

Figure 5:
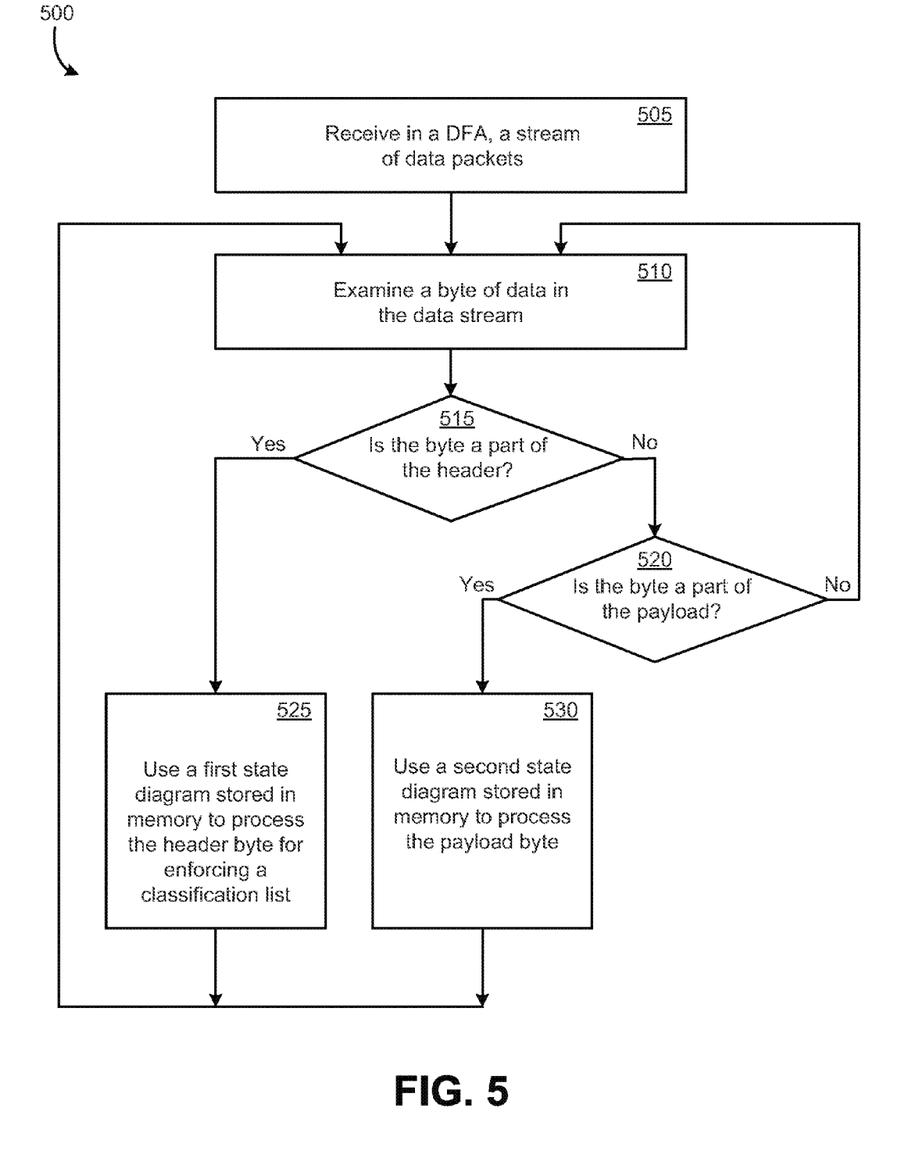
FIG. 5 is a flowchart illustrating an example process of analyzing the header portion and the payload portion of an input data packet.

FIG. 5 shows a flow chart 500 that describes a method for processing the header portion as well as the payload portion of a data packet that is part of a data stream of data packets. A few non-exhaustive examples of such a data stream include: a stream of ethernet data packets, a stream of TCP/IP data packets, a stream of User Datagram Protocol (UDP) packets, and a stream of Asynchronous Transfer Mode (ATM) data packets. Persons of ordinary skill in the art can recognize that the classification list processing described herein is applicable to a wide variety of data streams containing header portions and corresponding payload portions. All such data streams are included in the scope of this disclosure.

In block 505, a DFA unit is configured to receive the data stream composed of data packets. One such example process has been described above using FIG. 2, which shows DFA unit 225 configured to receive input data packet 209 via input/output 230 and system bus 245.

In block 510, a byte of data contained in the data stream is examined. A determination is made (block 515) whether this byte of data is a part of a header. If the byte of data is a portion of a header, in block 525, a first state diagram is used to process the byte in order to enforce a classification list. One such example process has been described above using FIGS. 3A and 3B where a first byte (10) is processed by a state diagram 300 for enforcing classification list 260.

If it is determined in block 515 that the byte is not a part of a header, a further determination is made in block 520 whether the byte is part of a payload. If not a part of a payload, processing moves from block 520 to block 510 where the next byte of data contained in the data stream of data packets is examined and processed.

If found to be part of a payload, processing moves to block 530, where the payload byte is processed using a second state diagram. In this context, attention is drawn to FIG. 2 which shows the first and second state diagrams, each generated separately and stored as two distinct state diagrams in memory 235. DFA unit 225 accesses either the first or the second state diagram in order to process either the header 215 or the payload 210 respectively as bytes contained therein are presented to DFA unit 225.

Figure 6:
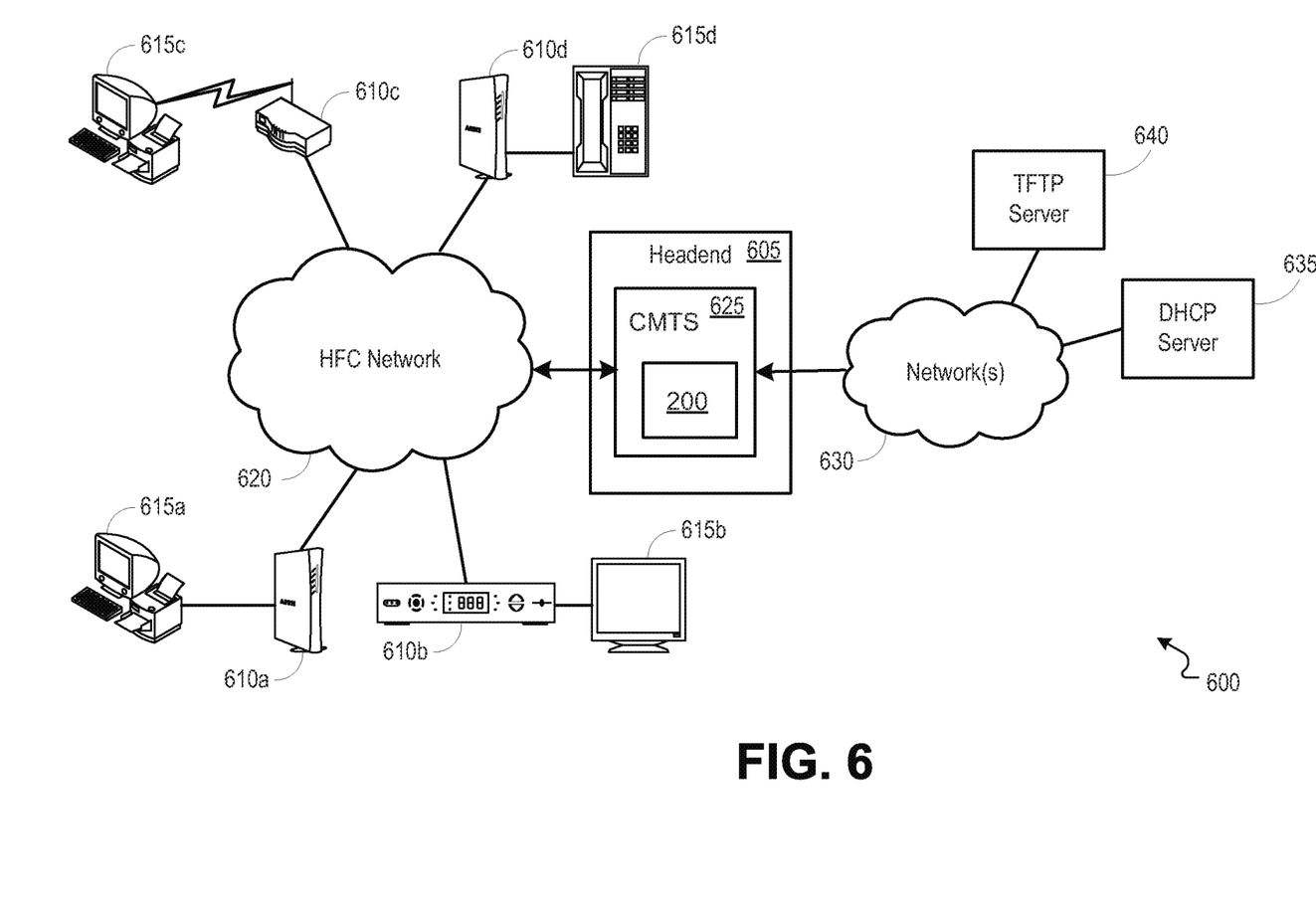
FIG. 6 is a block diagram illustrating an example communication network that includes a cable modem termination system (CMTS) incorporating the communication system of FIG. 2.

FIG. 6 shows a communication network 600 that includes a cable modem termination system (CMTS) 625 incorporating the communication system 200 shown in FIG. 2. Communications network 600 will now be described in further detail.

Headend 605 provides various services such as video, data and/or voice service(s) to customer premise equipment (CPE) devices 610a-d. The CPE devices can include, for example, a cable modem 610a, a set top box 610b, a wireless router including an embedded cable modem 610c or a media terminal adapter (MTA) 610d, among others. A cable modem 610a can facilitate communications from the headend 605 to a computer 615a. A set top box 610b can facilitate communications from the headend 605 to a television or a digital video recorder. A wireless router 110c can facilitate wireless communication with a computer 615c to a headend 605. An MTA 610d can facilitate communications between a telephone 615d to a headend 605.

The CPE devices 610a-d can communicate with the headend 605 via a hybrid fiber-coax (HFC) network 620. The headend 605 includes devices such as a cable modem termination system (CMTS) 625 and/or an edge quadrature amplitude modulation (EQAM) device (not shown), or a combined or converged device (not shown) including multiple edge and/or video or data processing functionalities. Such devices can operate to facilitate communications between a network 630 and the CPE devices 610a-d. In various implementations, the network 630 can include one or more networks internal to the headend and/or one or more network external to the headend (e.g., one or more extranets, the Internet, etc.).

Data services are handled by the headend 605 through CMTS 625. The CMTS 625 receives data signals from external device(s) or nodes through network(s) 630. The network(s) 130, for example, operates using Internet protocol (IP), sending data packets to and receiving data packets from the headend 605. These data packets can be processed by communication system 200 in order to suitably route the data packets. In some examples, the CMTS 625 can be paired with a SIP proxy server (not shown) operable to provide voice over internet protocol (VoIP) services with voice connectivity to other subscribers or voice connectivity to a public switched telephone network (PSTN) (not shown). In still further examples, one or more video sources may provide streaming data through the network(s) 630 to the CMTS 625.

In some implementations, the CMTS 625 forwards packets destined for subscribers to an EQAM device used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more CPE devices 610a-d via the hybrid fiber-coax (HFC) network 620. In other implementations, the CMTS 625 can modulate a baseband signal to a carrier wave and transmit the signal to a combiner for up-conversion to a transmission frequency.

When a CPE device 610a-d initially attempts to connect to the headend 605, the device 610a-d goes through a channel scanning, ranging and registration process with the headend 605. The channel scanning process can include the CPE device 610a-d checking a nonvolatile data store for channels on which the device 610a-d previously managed a successful connection to the headend 605.

In some implementations, the CPE device(s) 610a-d can include a LAN address table (e.g., CPE table). The LAN address table can be operable to store a source MAC address when a packet is received at the CPE device 610a-d from the LAN side of the CPE device (e.g., from a subscriber device 615a-d or other device networked to the CPE device or subscriber device). Thus, when new packets are received on the LAN side of a CPE device 610a-d, the CPE device(s) 610a-d can determine whether the packet should be transferred to the WAN side of the device, or redirected back onto the LAN side, or dropped based upon the presence of the source MAC address in the WAN address table. This process, as well as other processes described below, can be implemented using communication system 200 with the appropriate addresses stored in header 215. The incorporation of communication system 200 into one or more of CPE devices 610*a-d* is not shown in FIG. 6 to avoid cluttering the drawing, but can be understood in the context of the description herein.

It should be understood that though in the example network shown in FIG. 6, communications system 200 is incorporated into CMTS 625, in various other implementations communication system 200 can be incorporated into various other elements of communication network 600. For example, communication system 200 can be incorporated into one of the CPE devices 610*a-b* as explained above, and/or in the TFTP server 640, and/or the DHCP server 635.

Figure 7:
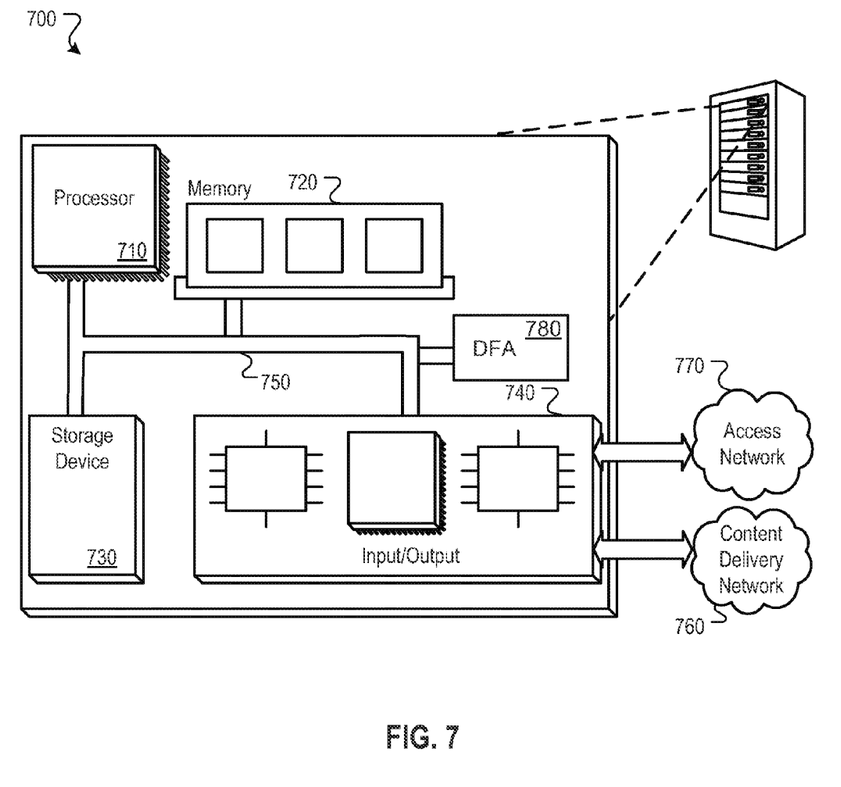
FIG. 7 is a block diagram illustrating an example generic computing platform that incorporates a DFA unit for classification list processing of incoming data packets.

Attention is now drawn to FIG. 7, which shows a generic computing platform 700 that incorporates a DFA unit 780 for classification list processing. Computing platform 700 can include a processor 710, a memory 720, a storage device 730, and an input/output device 740. Each of the components 710, 720, 730, and 740 can, for example, be interconnected using a system bus 750. The processor 710 is capable of processing instructions for execution within the computing platform 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the computing platform 700. In one implementation, the memory 720 is a computer-readable medium. In one implementation, the memory 720 is a volatile memory unit. In another implementation, the memory 720 is a non-volatile memory unit.

In some implementations, the storage device 730 is capable of providing mass storage for the computing platform 700. In one implementation, the storage device 730 is a computer-readable medium. In various different implementations, the storage device 730 can, for example, include a hard disk device, an optical disk device, flash memory or some other large capacity storage device.

The input/output device 740 provides input/output operations for the computing platform 700. In one implementation, the input/output device 740 can include one or more of a wireless interface, HFC network interface, such as, for example, an IP network interface device, e.g., an Ethernet interface, a cellular network interface, a serial communication device, e.g., and RS-232 port, and/or a wireless interface device, e.g., and 802.11 card. In another implementation, the input/output device 740 can include driver devices configured to receive input data and send output data to other input/output devices, as well as sending communications to, and receiving communications from various networks (e.g., content delivery network 760 and/or access network 770).

The classification list processing of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "processor" encompasses all apparatus, devices, and machines for processing data, including by way of example a programmable processor, a digital signal processor, a computer, or multiple processors or computers. The "processor" can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) for implementing classification list processing can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   generating a header state diagram from a classification list;
   storing the header state diagram in one or more data stores;
   receiving header data at a deterministic finite automata module;
   enforcing the classification list at the deterministic finite automata module using the header state diagram stored in the one or more data stores to process the header data;
   determining whether a byte associated with an incoming data stream is part of a payload or a header; and
   analyzing the byte based upon whether the byte is part of the payload or the header.

2. The computer-implemented method of claim 1, further comprising:
   receiving the incoming data stream;
   examining data included in the incoming data stream; and
   determining whether the byte is part of the header.

3. The computer-implemented method of claim 2, further comprising:
   determining whether the byte is part of a payload; and
   using a payload state diagram stored in the one or more data stores to process the byte using the deterministic finite automata module based upon determining the byte is part of the payload.

4. The computer-implemented method of claim 3, further comprising if the byte is not part of the payload identifying a next byte of data included in the incoming data stream.

5. The computer-implemented method of claim 1, further comprising continuing to perform the method until the incoming data stream is terminated.

6. One or more non-transitory computer readable media operable to store computer readable instructions, the computer readable instructions being operable to cause a processor perform a series of steps, comprising:
   generating a header state diagram from a classification list;
   storing the header state diagram in one or more data stores;
   receiving header data at a deterministic finite automata module;
   enforcing the classification list at the deterministic finite automata module using the header state diagram stored in the one or more data stores to process the header data;
   determining whether a byte associated with an incoming data stream is part of a payload or a header; and
   analyzing the byte based upon whether the byte is part of the payload or the header.

7. The one or more non-transitory computer readable media of claim 6, the steps further comprising:
   receiving the incoming data stream;
   examining data included in the incoming data stream; and
   determining whether the byte is part of the header.

8. The one or more non-transitory computer readable media of claim 7, the steps further comprising:
   determining whether the byte is part of a payload; and
   using a payload state diagram stored in the one or more data stores to process the byte using the deterministic finite automata module based upon determining the byte is part of the payload.

9. The one or more non-transitory computer readable media of claim 8, the steps further comprising if the byte is not part of the payload identifying a next byte of data included in the incoming data stream.

10. The one or more non-transitory computer readable media of claim 9, the steps further comprising continuing to perform the method until the incoming data stream is terminated.

11. A system comprising:
   an interface operable to receive a classification list;
   a converter operable to define classification list as a classification list state machine operable to be implemented by a deterministic finite automata module;
   one or more data stores operable to store the state machine defining the classification list;
   the deterministic finite automata module being operable to receive a data stream and process the data stream based upon the classification list state machine;

wherein the converter is operable to receive a header data template and to convert the header data template into a header state machine operable to be implemented by the deterministic finite automata module and the deterministic finite automata being further operable to identify header data based upon a header state machine and process the header data based upon the identification using the classification list state machine.

12. The system of claim 11, wherein the converter is operable to receive a payload data template and to convert the payload data template into a payload state machine operable to be implemented by the deterministic finite automata module.

13. The system of claim 12, wherein the deterministic finite automata is further operable to identify payload data based upon the payload state machine and process the payload data based upon the identification.

\* \* \* \* \*